(12) United States Patent
Büthe et al.

(10) Patent No.: US 7,643,713 B2
(45) Date of Patent: Jan. 5, 2010

(54) COMPOSITE CABLE

(75) Inventors: Harald Büthe, Nettetal (DE); Harald Heymanns, Mönchengladbach (DE); Gerd Verdenhalven, Obernkirchen (DE)

(73) Assignee: Nexans, Paris (FR)

( * ) Notice: Subject to any disclaimer, the term of this patent is extended or adjusted under 35 U.S.C. 154(b) by 189 days.

(21) Appl. No.: 11/511,880

(22) Filed: Aug. 28, 2006

(65) Prior Publication Data

US 2007/0110376 A1    May 17, 2007

(30) Foreign Application Priority Data

Aug. 31, 2005    (EP)    ................................. 05291809

(51) Int. Cl.
*G02B 6/44*    (2006.01)
(52) U.S. Cl. ........................ 385/101; 385/107; 385/113
(58) Field of Classification Search ........................ None
See application file for complete search history.

(56) References Cited

U.S. PATENT DOCUMENTS

| | | | | |
|---|---|---|---|---|
| 3,865,466 A | * | 2/1975 | Slaughter | ..................... 385/103 |
| 4,272,155 A | * | 6/1981 | Slaughter | ..................... 385/111 |
| 4,443,657 A | * | 4/1984 | Hill et al. | ............... 174/110 FC |
| 4,575,184 A | * | 3/1986 | Ueno et al. | ................... 385/101 |
| 4,711,811 A | * | 12/1987 | Randa | ......................... 428/383 |
| 4,815,813 A | * | 3/1989 | Arroyo et al. | ................ 385/102 |
| 4,907,855 A | * | 3/1990 | Oestreich | ..................... 385/107 |
| 5,237,635 A | * | 8/1993 | Lai | ............................. 385/101 |
| 5,268,971 A | * | 12/1993 | Nilsson et al. | .............. 385/101 |
| 5,270,486 A | * | 12/1993 | Chan et al. | ................. 174/23 R |
| 5,418,878 A | * | 5/1995 | Sass et al. | .................... 385/101 |
| 5,913,003 A | * | 6/1999 | Arroyo et al. | ................ 385/101 |
| 6,091,025 A | * | 7/2000 | Cotter et al. | ............. 174/110 R |

* cited by examiner

*Primary Examiner*—Mike Stahl
(74) *Attorney, Agent, or Firm*—Sofer & Haroun, LLP

(57) ABSTRACT

A composite cable to be laid by being drawn or blown into a cable tube, which has at least two insulated copper wires (1, 2) which are stranded with one another, and at least one single-fiber optical waveguide (3, 4) and a cable sheath (5). The insulation of the copper wires has an inner layer (1*b*, 2*b*) with foamed polymer and an outer layer (1*c,* 2*c*) including an unfoamed polymer (foam skin). The optical waveguide(s) (3, 4) being arranged in the stranding gaps in the insulated copper wires (1, 2) which are stranded with one another, and reinforcing elements (5*a*) are made from a material having a high tensile strength being embedded in the sheath (5).

8 Claims, 1 Drawing Sheet

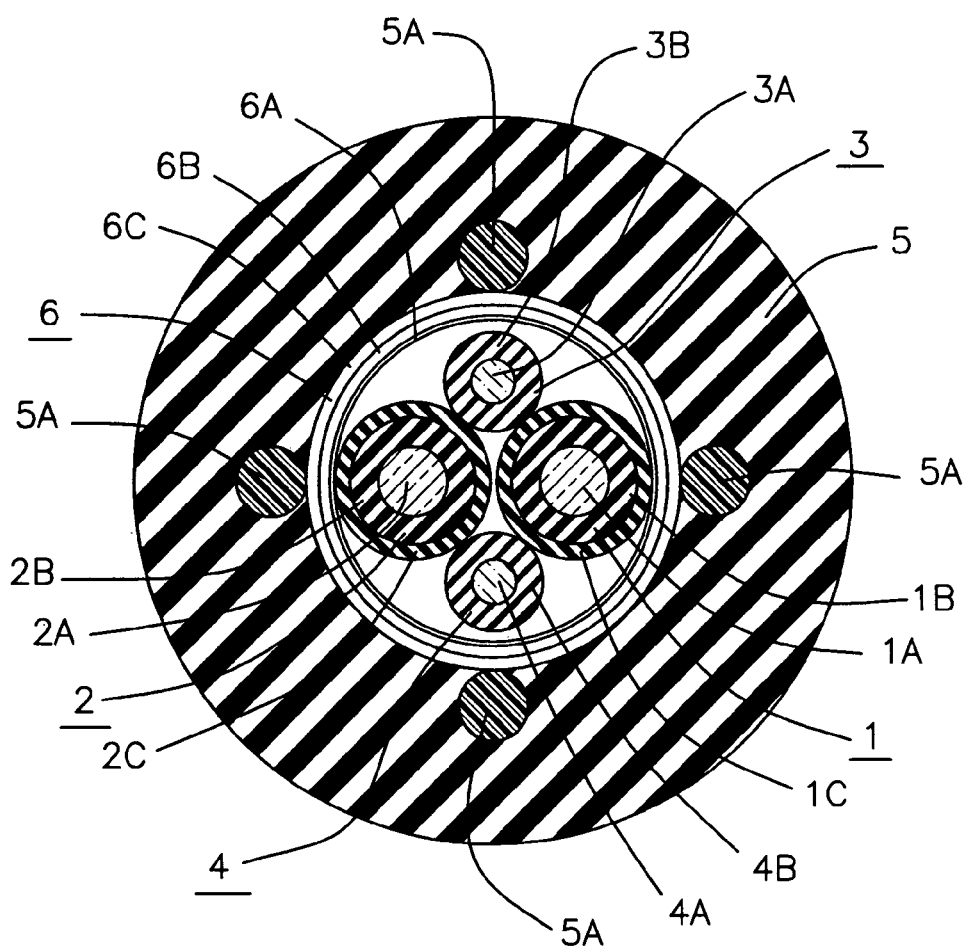

COMPOSITE CABLE

The invention relates to a composite cable to be laid by being drawn or blown into a cable tube.

DE 101 49 122 has disclosed a composite cable which contains insulated copper wires and a plurality of optical waveguides, a plurality of lines being provided which are twisted in pairs and each comprise a pair of insulated copper wires. The pairs of insulated copper wires are twisted with one another in different laying lengths. Each optical waveguide is in the form of a multiple-core plastic optical waveguide. The insulated copper wires twisted in pairs and the multiple-core plastic optical waveguides are arranged adjacent to one another and all of the copper conductors twisted in pairs and the multiple-core plastic optical waveguides are twisted with one another.

Such a cable comprising at least two pairs and two multiple-core optical waveguides has an outer diameter which is too large for the blowing-in technique and is furthermore not very flexible. The known composite cable is therefore designed exclusively for the domestic distribution cables application.

The present invention is based on the object of providing a composite cable which is extremely flexible, has sufficient tensile strength and is suitable for being laid by being drawn or blown into a tubular channel.

This object is achieved by the features included in claim 1.

The optical waveguide(s) make(s) it possible to connect buildings to the digital data network (fiber to the home—FTTH), while the insulated copper wires are used for remotely powering loads but can also be used for localization purposes of the composite cable. Furthermore, the stranded copper conductors can also be used as a trunk cable for telephones (POTS) and/or a high-bit-rate xDSL link.

The composite cable in accordance with the teaching of the invention is an outdoor cable which is particularly suitable for being laid by being blown into cable tubes.

In order not to restrict the possibility of blowing or drawing the composite cable into a cable tube too considerably, no more than three insulated copper wires should be used. The number of optical waveguides can be virtually as desired, but should be restricted to a maximum of three optical waveguides for reasons of cost.

Further advantageous refinements of the invention are included in the dependent claims.

The invention will be explained in more detail with reference to the exemplary embodiment illustrated schematically in the FIGURE of a particularly advantageous composite cable.

The composite cable comprises a pair of two insulated copper conductors 1 and 2, two optical waveguides 3 and 4, a sheath 5 and wrapping 6 surrounding the pair and the cable core assembly forming the optical waveguides 3 and 4.

The insulated copper conductors 1 and 2 each comprise the conductor 1*a*, 2*a*, which may be in the form of a single copper wire or be formed from a plurality of copper wires.

The copper wires 1*a*, 2*a* are surrounded by a first insulating layer 1*b*, 2*b*, which consists of foamed polyethylene. A second insulating layer 1*c*, 2*c*, which consists of unfoamed polyethylene, is arranged over the first insulating layer 1*b*, 2*b*. Such an insulating structure is known per se in telecommunications cable technology and is referred to as foam skin. The insulated copper wires are stranded with one another and form the pair.

The optical waveguides 3 and 4 comprise a glass fiber or a plastic fiber 3*a*, 4*a*, which, as is known, comprise an optically conducting core and a layer which usually consists of plastic and surrounds the optically conducting core. The glass fiber or plastic fiber 3*a*, 4*a* is surrounded by a plastic layer 3*b*, 4*b*. The glass fiber or plastic fiber 3*a*, 4*a* and the plastic layer 3*b*, 4*b* form a tight-buffered cable or a virtually tight-buffered cable. The optical waveguides 3 and 4 are arranged in the stranding gaps of the pair.

The wrapping 6 comprises a first layer 6*a* of non-hygroscopic foils, a second layer 6*b* of an aluminum foil and a third layer 6*c* of non-hygroscopic foils. The layer 6*b* of aluminum foil is used for shielding purposes.

The sheath 5 advantageously consists of polyethylene, in particular a high-density polyethylene (HDPE). Four reinforcing elements 5*a*, which may either consist of a polyaramide or of glass-fiber-reinforced plastic, are arranged in the sheath 5. The reinforcing elements 5*a* are embedded in the sheath 5. They extend in the longitudinal direction of the cable or at an angle of at most 10° with respect to the longitudinal axis of the cable in the direction of lay of the pair. In one particularly advantageous refinement of the invention, the composite cable has the following properties

| Outer diameter | 6.5 mm |
| Weight | 40 kg/km |
| Minimum bending radius (static) | 40 mm |
| Minimum bending radius (dynamic) | 80 mm |
| Maximum tensile force | 220 N |

The composite cable according to the invention can be introduced into cable tubes using the so-called blowing-in technique.

The combination of optical waveguides and a copper pair provides a comprehensive solution for remotely powering FTTH terminals or distribution frames. The copper pair can also be used, for example, for localizing the composite cable and as a trunk cable for POTS and/or a high-bit-rate xDSL link.

The invention claimed is:

1. A composite cable to be laid by being drawn or blown into a cable tube, comprising:
   at least two insulated copper wires stranded with one another,
   at least one single-fiber optical waveguide, and
   a cable sheath,
   wherein said insulation of said copper wires includes a foamed polymer inner layer and an unfoamed polymer outer layer, and
   said at least one single-fiber optical waveguide is arranged in the stranding gaps of said insulated copper wires which are stranded with one another,
   wherein the wires and said at least one waveguide are surrounded by a first layer of non-hygroscopic foils, at least one layer of an aluminum foil arranged on said first layer of non-hygroscopic foils, and a second layer of non-hygroscopic foils lying on said layer of said aluminum foil, and
   reinforcing elements made from a material having a high tensile strength embedded in the sheath, wherein said layers are surrounded by the sheath.

2. The composite cable as claimed in claim 1, wherein the composite cable has two single-fiber optical waveguides and two insulated copper wires which are stranded to form a pair.

3. The composite cable as claimed in claim 1, wherein the inner layer of the insulation of the copper wires consists of foamed polyethylene and the outer layer of the insulation of the copper wires consists of unfoamed polyethylene.

4. The composite cable as claimed in claim 1, wherein the optical waveguides each comprise an optical glass fiber and a plastic layer.

5. The composite cable as claimed in claim 1, wherein the reinforcing elements are arranged such that they are distributed uniformly over the circumference.

6. The composite cable as claimed in claim 2, wherein the reinforcing elements extend such that they run in longitudinally or with an offset angle of a maximum of 10° with respect to the longitudinal axis of the composite cable in the direction of lay of the pair.

7. The composite cable as claimed in claim 1, wherein the reinforcing elements are laid directly onto the second layer of non-hygroscopic foils.

8. The composite cable as claimed in claims 1, wherein the reinforcing elements consist of glass-fiber-reinforced plastic.

* * * * *